May 26, 1959  F. P. TAGLIAFERRI ET AL  2,887,982
FLAT-TIRE INDICATOR
Filed Nov. 30, 1956
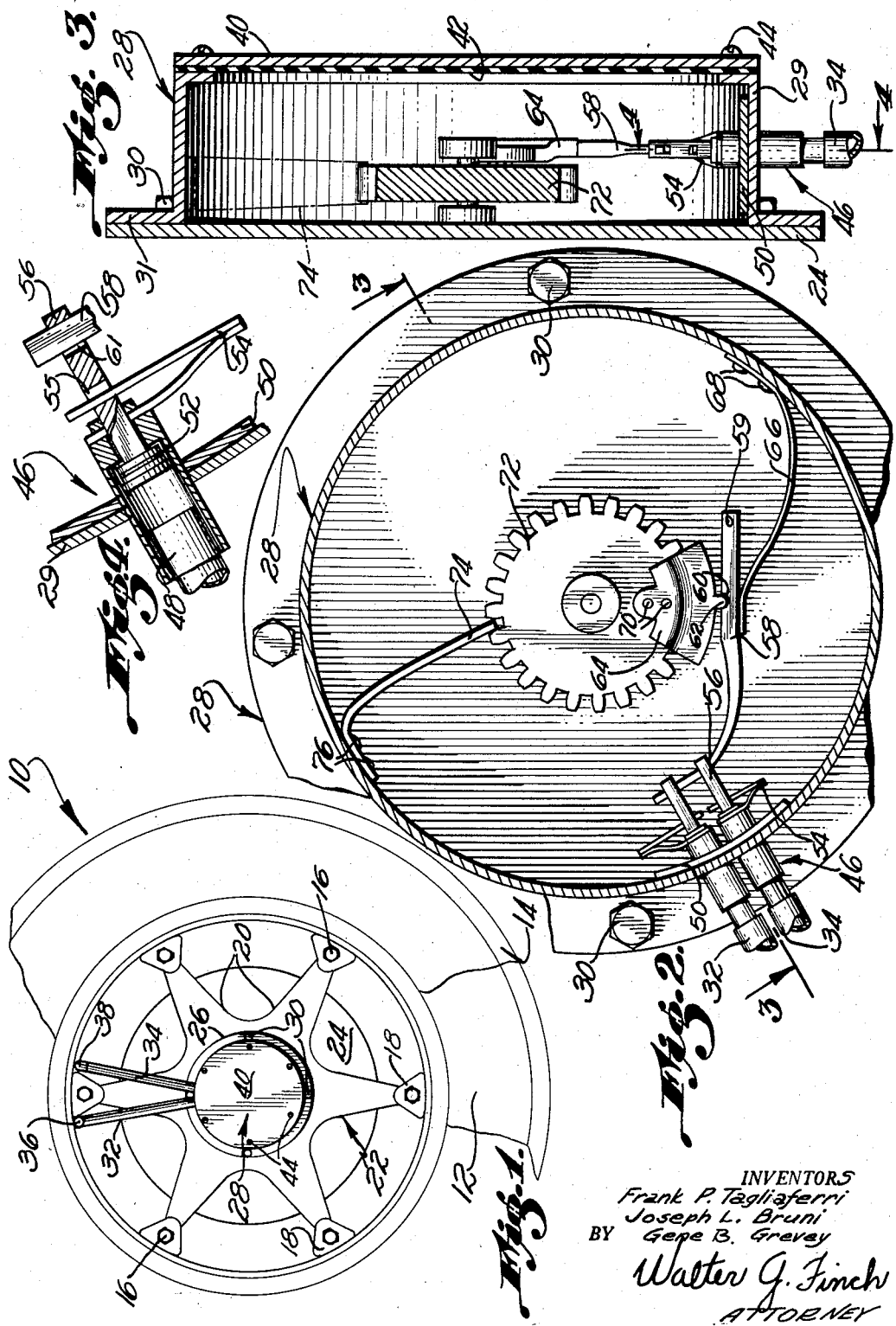
INVENTORS
Frank P. Tagliaferri
Joseph L. Bruni
BY Gene B. Grevey
Walter G. Finch
ATTORNEY United States Patent Office 2,887,982
Patented May 26, 1959

2,887,982

FLAT-TIRE INDICATOR

Frank P. Tagliaferri, Joseph L. Bruni, and Gene B. Grevey, Baltimore, Md.

Application November 30, 1956, Serial No. 625,378

1 Claim. (Cl. 116—34)

This invention relates generally to indicating devices, and more particularly to a mechanical arrangement for indicating that a tire of a pair of tires on a dual wheel is flat.

For a long time, there has been a long felt need for a simple mechanical arrangement which could be utilized to indicate to a driver of a vehicle that a single tire of a pair of adjacent tires mounted on a dual wheel is flat.

It is an object of this invention, therefore, to provide a simple mechanical arrangement which can be used as a flat tire indicator.

Another object of this invention is to provide a flat tire indicator which can be utilized simultaneously to indicate if one or both tires of a dual wheel are flat.

To provide a flat tire indicator which has a minimum of component parts and which is easy to install on a dual wheel, are other objects of this invention.

And other objects of this invention are to provide a flat tire indicator for a dual set of wheels which is economical to manufacture, efficient and reliable in operation, and easy to maintain.

To provide a flat tire indicator which is compact and makes a noise to signal the driver of a truck or like vehicle that one of the tires of a dual pair of wheels is flat, are still other objects of this invention.

These and other objects and advantages of this invention will become more apparent by reference to the following description taken in conjunction with the single sheet of accompanying drawings in which:

Fig. 1 is a side elevation, partly fragmentary, showing the inside and outside tires of a truck, illustrating the flat tire indicator in position;

Fig. 2 is an enlarged, side elevation of the flat tire indicator, with its cover removed;

Fig. 3 is a cross section taken along line 3—3 of Fig. 2; and

Fig. 4 is a cross section taken along line 4—4 of Fig. 3.

Referring now to Fig. 1 of the drawing, there is illustrated a dual wheel 10 of a truck having an inside tire 12 and an outside tire 14. These tires 12 and 14 are mounted on suitable rims each having a web 22 with spokes 20. The ends of the spokes are secured to rim clamps 18 by suitable bolts and stud nuts 16. The wheel drum 24 is positioned on the wheel hub 26.

The flat tire indicator 28, comprising this invention, is positioned on the end of the wheel hub 26 by a suitable adapter, as seen generally in Fig. 1, and in detail in Figs. 2, 3 and 4. The indicator 28 is secured to the wheel drum 24 by suitable bolts 30 which pass through the flange 31 of the casing 29 of the flat tire indicator 28, as shown in Fig. 3.

A cover 40 is utilized to cover the end of the indicator 28, and it is secured to the casing 29 of the indicator 28 by screws 44. As shown in Fig. 3, a gasket 42 may be positioned between the cover 40 and the casing 29. A hose 32 and a hose 34 is provided from the flat tire indicator 28 to the outside and inside valve stems 36 and 38 of the outside and inside tires 14 and 12, respectively.

Referring now to Figs. 2, 3 and 4, the flat tire indicator 28 is shown in considerable detail, and it is so designed as to automatically indicate a flat tire. Each hose 32 or 34 from the valve stems 36 and 38 is secured to a pressure valve 46 which passes through the casing 29 and a suitable lock nut 50 of the flat tire indicator 28.

A typical pressure valve 46 is illustrated in detail in Fig. 4. It includes an adapter 48 for each hose 32 or 34, which is inserted in one end of the pressure valve 46 and a trip arm holder 56 which has its lower end positioned in the valve 46 and its upper end in engagement with a tripping arm 58. The lower end of the trip arm holder 56 has a rubber washer 52 secured to it.

Each trip arm holder 56 has an opening 55 for receiving the free end of a steel spring 54, and whose other end is secured to the trip arm holder. The free end of the tripping arm 58 is received in the openings 61 provided in each trip arm holder 56. The other end of the tripping arm 58 is mounted for pivotal movement by a pin 59.

A steel spring 66, secured to the inside of the casing 20 of the flat tire indicator 28 by rivets 68, is utilized to hold the tripping arm 58 in an operative position.

A notch 60 is provided in the tripping arm 58, and it receives an extension 62 from a counterweight 64. This counterweight 64 is secured to a gear 72 by screws or bolts 70. Gear 72 is mounted for rotary movement, and it has a plurality of teeth which are arranged to engage one end of a steel spring rattling arm 74, whose other end is secured to the inside of the flat tire indicator casing 29 by rivets 76.

In operation, when there is air in a tire, such as 12 or 14, the pressure valve 46 for each valve hose 32 or 34 will stay in an upward position, holding the tripping arm 58 upwardly and locking the counterweight 64 so that the gear 72 cannot rotate, by means of the steel spring 66.

When the tire 12 or 14 goes flat, the pressure in the tire is released, this releasing a pressure valve 46 so that a steel spring 54 will pull down the tripping arm holder 56 and the tripping arm 58 to release the counterweight 64. The counterweight 64, in turn, will create a drag on the gear 72 which will tend to stand still while the wheel is turning. The spring rattling arm 74, since it makes the same number of revolutions as the wheel, will then begin to vibrate or oscillate, thus creating a noise which will be heard by the driver of the truck, thus warning him that he has a flat tire.

Obviously many modifications and variations of the present invention are possible in the light of the above teachings. It is, therefore, to be understood that within the scope of the appended claim the invention may be practiced otherwise than as specifically described.

What is claimed is:

A flat tire indicator for a tire mounted on a wheel having a hub, comprising, a housing secured to said hub, a pressure valve extending through said housing and having one end thereof connected to a valve stem of said tire, and its other end free, means including a gear having a plurality of teeth mounted for rotation within said housing, a counterweight integrally secured to said gear, and having an extending portion, a lever having one end pivotally mounted to said housing, a first spring having one end integrally secured to said housing with the other end free, for biasing said lever against said counterweight, said lever having a notch provided therein intermediate its ends for receiving said extending portion of said counterweight to lock said counterweight in position against said lever so that said gear rotates with said wheel when said tire is pressurized, a spring element having one end thereof integrally connected to said housing and the other end free to engage said teeth of said gear, the other end of said lever engaging the free end of said pressure valve, and means including a second spring associated with said pressure vale for biasing said other end of said lever away from said counterweight to disengage said extending portion of said counterweight from said notch in said lever, whereby when the pressure in said tire is released, said counterweight is disengaged from said lever by said pressure valve pulling downwardly on said lever to disengage the extending portion of said counterweight from the notch in said lever, with said counterweight causing said gear to stand still so that said other end of said spring element engages said teeth of said gear to cause an alarm to indicate said tire is depressurized.

References Cited in the file of this patent

UNITED STATES PATENTS 1,447,595    Martin _____ Mar. 6, 1923

FOREIGN PATENTS 277,518    Switzerland _____ Aug. 31, 1951